United States Patent
Toda (10) Patent No.: US 6,784,871 B2
(45) Date of Patent: Aug. 31, 2004

(54) ULTRASONIC SECURITY SYSTEM FOR PERSONAL COMPUTER

(76) Inventor: Kohji Toda, 1-49-18 Futaba, Yokosuka 239-0814 (JP)

( * ) Notice: Subject to any disclaimer, the term of this patent is extended or adjusted under 35 U.S.C. 154(b) by 404 days.

(21) Appl. No.: 09/916,739

(22) Filed: Jul. 26, 2001

(65) Prior Publication Data

US 2003/0020695 A1 Jan. 30, 2003

(51) Int. Cl.[7] ............................................. G09G 5/00
(52) U.S. Cl. ...................... 345/156; 345/173; 340/5.67; 310/313 R; 310/313 B
(58) Field of Search .......................... 345/173; 340/5.8, 340/10.1, 572.1, 5.61, 5.67; 310/313 R, 313 B (56) References Cited

U.S. PATENT DOCUMENTS

| | | | | |
|---|---|---|---|---|
| 5,734,326 A | * | 3/1998 | Skudera, Jr. | 340/572.1 |
| 6,121,892 A | * | 9/2000 | Reindl et al. | 340/5.8 |
| 6,522,047 B1 | * | 2/2003 | Toda | 310/313 B |
| 2002/0075132 A1 | * | 6/2002 | Toda | 340/5.61 |

\* cited by examiner

Primary Examiner—Alexander Eisen (57) ABSTRACT

An ultrasonic security system for personal computer comprises a touch-panel section, a lock section, and a key section. The touch-panel section comprises a nonpiezoelectric plate, at least one transducer-unit, and a signal analyzer. The transducer-unit consists of at least one input IDT $T_i$ (i=1, 2, ..., m), at least one output IDT $R_i$ (i=1, 2, ..., m), a first input piezoelectric substrate, and a first output piezoelectric substrate. The lock section comprises a second piezoelectric substrate, a coding IDT consisting of interdigital electrode pairs and having a coded pattern, and a terminal IDT having the electrode-finger direction parallel to that of the coding IDT. The key section comprises a third piezoelectric substrate, an initial IDT, and a decoding IDT having the same construction pattern as the coding IDT. If touching a position on the nonpiezoelectric plate, an electric signal appears at the output IDT $R_i$. The electric signal is applied to the coding IDT, and is detected as a coded burst-signal at the terminal IDT. The coded burst-signal arrives at the initial IDT. And then, a pulse is detected at the decoding IDT, if the coded burst-signal correlates to the coded pattern. As a result, the touch position is sensed by means of the phase of the pulse at the signal analyzer. In other words, no key section or a key section with a decoding IDT having the different construction pattern from the coding IDT causes no pulse. Consequently, far from sensing the touch position, it is not possible to operate the PC preparing such the ultrasonic security system for personal computer.

13 Claims, 7 Drawing Sheets

ULTRASONIC SECURITY SYSTEM FOR PERSONAL COMPUTER

BACKGROUND OF THE INVENTION

1. Field of the Invention

The present invention relates to an ultrasonic security system for personal computer by means of using a touch-panel section, a lock section, and a key section.

2. Description of the Prior Art

Construction of a security system for personal computer (PC) such as wearable PC, desktop- and laptop PCs, and notebook PC prevents the influence of noises and invaders, and makes it difficult to steal information through the PC, and in addition keeps a communication secret. However, it is difficult to keep secret by using the coding technique based on conventional hardware such as magnetic cards and IC cards. The magnetic cards are very convenient and popular, however it is easy to make copies thereof or steal passwords. The IC cards are superior to the magnetic cards in difficulty in counterfeiting of cards, however it is not enough to keep the information secret thoroughly.

Recently, touch panels in place of keyboards are convenient, especially for wearable PC. Conventional touch panels with, for example, ultrasonic transducers such as a wedge-shaped transducer and a piezoelectric thin film transducer make use of disappearing of an output electric signal, which disappears in response to a disappearance of an ultrasound on a touch panel by touching thereon. Disappearing of the output electric signal makes signal analysis complicated, and makes it difficult for the conventional touch panels to be of use as hardware for the coding technique.

SUMMARY OF THE INVENTION

An object of the present invention is to provide an ultrasonic security system for personal computer having a touch-panel section, which is contributory to the coding technique.

Another object of the present invention is to provide an ultrasonic security system for personal computer preventing the influence of noises and invaders.

Another object of the present invention is to provide an ultrasonic security system for personal computer making it difficult to steal information.

Another object of the present invention is to provide an ultrasonic security system for personal computer keeping a communication secret.

Another object of the present invention is to provide an ultrasonic security system for personal computer excellent in manufacturing and mass production.

Another object of the present invention is to provide an ultrasonic security system for personal computer operating under low electric power consumption with low voltage.

A still other object of the present invention is to provide an ultrasonic security system for personal computer having a small-sized circuit with a simple structure which is very light in weight.

According to one aspect of the present invention there is provided an ultrasonic security system for personal computer comprising a touch-panel section, a lock section, and a key section. The touch-panel section comprises a nonpiezoelectric plate, at least one transducer-unit, and a signal analyzer. The lock section comprises a second piezoelectric substrate, a coding interdigital transducer (IDT) consisting of interdigital electrode pairs and having a coded pattern, and a terminal IDT having the electrode-finger direction parallel to that of the coding IDT. The key section comprises a third piezoelectric substrate, an initial IDT, and a decoding IDT having the same construction pattern as the coding IDT. The transducer-unit consists of at least one input IDT $T_i$ (i=1, 2, ..., m), at least one output IDT $R_i$ (i=1, 2, ..., m), a first input piezoelectric substrate, and a first output piezoelectric substrate. The input IDT $T_i$ has an interdigital periodicity P and an overlap length L. The output IDT $R_i$ has the electrode-finger direction slanting to that of the input IDT $T_i$ by an angle $\theta$, and has an interdigital periodicity $P_N$ along the orthogonal direction to the electrode-finger direction of the output IDT $R_i$ and an overlap length $L_P$ along the electrode-finger direction of the output IDT $R_i$.

When an input electric signal is applied to the input IDT $T_i$, a first surface acoustic wave (SAW) is excited in the first input piezoelectric substrate. The first SAW is transmitted to the first output piezoelectric substrate along an upper end surface of the nonpiezoelectric plate, and transduced to electric signals $E_j$ (j=1, 2, ..., n) at the output IDT $R_i$. Thus, SAW propagation lanes $W_j$ (j=1, 2, ..., n) on the upper end surface of the nonpiezoelectric plate are formed between the input IDT $T_i$ and the output IDT $R_i$. In this time, the phase delays of the electric signals $E_j$ linearly correlate to the SAW propagation lanes $W_j$. If touching one of the SAW propagation lanes $W_j$, one of the electric signals $E_J$ is detected at the output IDT $R_i$. The one of the electric signals $E_J$ is applied to the coding IDT, so that a second SAW based on the coded pattern is excited on the second piezoelectric substrate. The second SAW is detected as a coded burst-signal at the terminal IDT. The coded burst signal arrives at the initial IDT, so that a third SAW is excited on the third piezoelectric substrate. In this time, if the third SAW correlates to the coded pattern, a pulse is detected at the decoding IDT. The pulse arrives at the signal analyzer. As a result, the one of the SAW propagation lanes $W_j$ is sensed by means of the phase of the pulse.

According to another aspect of the present invention there is provided at least one output IDT $R_i$ having the interdigital periodicity $P_N$ which is equal to the product of the interdigital periodicity P and cos $\theta$, and the overlap length $L_P$ which is equal to not only the product of the overlap length L and sec $\theta$, but also the product of the interdigital periodicity P and cosec $\theta$.

According to another aspect of the present invention there are provided first input-, first output-, second-, and third piezoelectric substrates made of a piezoelectric ceramic, respectively, the polarization axis thereof being parallel to the thickness direction thereof.

According to another aspect of the present invention there are provided first input-, first output-, second-, and third piezoelectric substrates having a thickness smaller than the interdigital periodicity P, and a nonpiezoelectric plate having a thickness larger than three times the interdigital periodicity P.

According to another aspect of the present invention there is provided an ultrasonic security system for personal computer, wherein the phase velocity of the first SAW on the nonpiezoelectric plate alone is higher than that in the first input-, and first output piezoelectric substrates alone.

According to other aspect of the present invention there is provided an amplifier connected between the signal analyzer and the input IDT $T_i$.

According to a further aspect of the present invention there is provided an ultrasonic security system for personal computer comprising a touch-panel section, a lock section, and a key section. The touch-panel section comprises a nonpiezoelectric plate, two transducer-units, and a signal analyzer. The lock section comprises a second piezoelectric substrate, two coding IDTs, and two terminal IDTs. It is possible for the coding IDTs to have the different coded patterns from each other. The key section comprises a third piezoelectric substrate, two initial IDTs, and two decoding IDTs.

When an input electric signal is applied to the input IDT $T_i$ of each of the transducer-units, a first SAW is excited in the first input piezoelectric substrate. The first SAW is transmitted to the first output piezoelectric substrate along an upper end surface of the nonpiezoelectric plate, and transduced to electric signals $E_j$ (j=1, 2 . . . , n) at the output IDT $R_i$ of each of the transducer-units. Thus, SAW propagation lanes $W_j$ (j=1, 2, . . . , n) on the upper end surface of the nonpiezoelectric plate are formed between the input IDT $T_i$ and the output IDT $R_i$. If touching one of the SAW propagation lanes $W_j$, one of the electric signals $E_j$ is detected at the output IDT $R_i$. The one of the electric signals $E_j$ is applied to each of the coding IDTs, so that a second SAW based on the coded pattern is excited on the second piezoelectric substrate. The second SAW is detected as a coded burst-signal at each of the terminal IDTs. The coded burst signal arrives at each of the initial IDTs, so that a third SAW is excited on the third piezoelectric substrate. In this time, if the third SAW correlates to the coded pattern, a pulse is detected at each of the decoding IDTs. The pulse arrives at the signal analyzer. As a result, the one of the SAW propagation lanes $W_j$ is sensed by means of the phase of the pulse.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
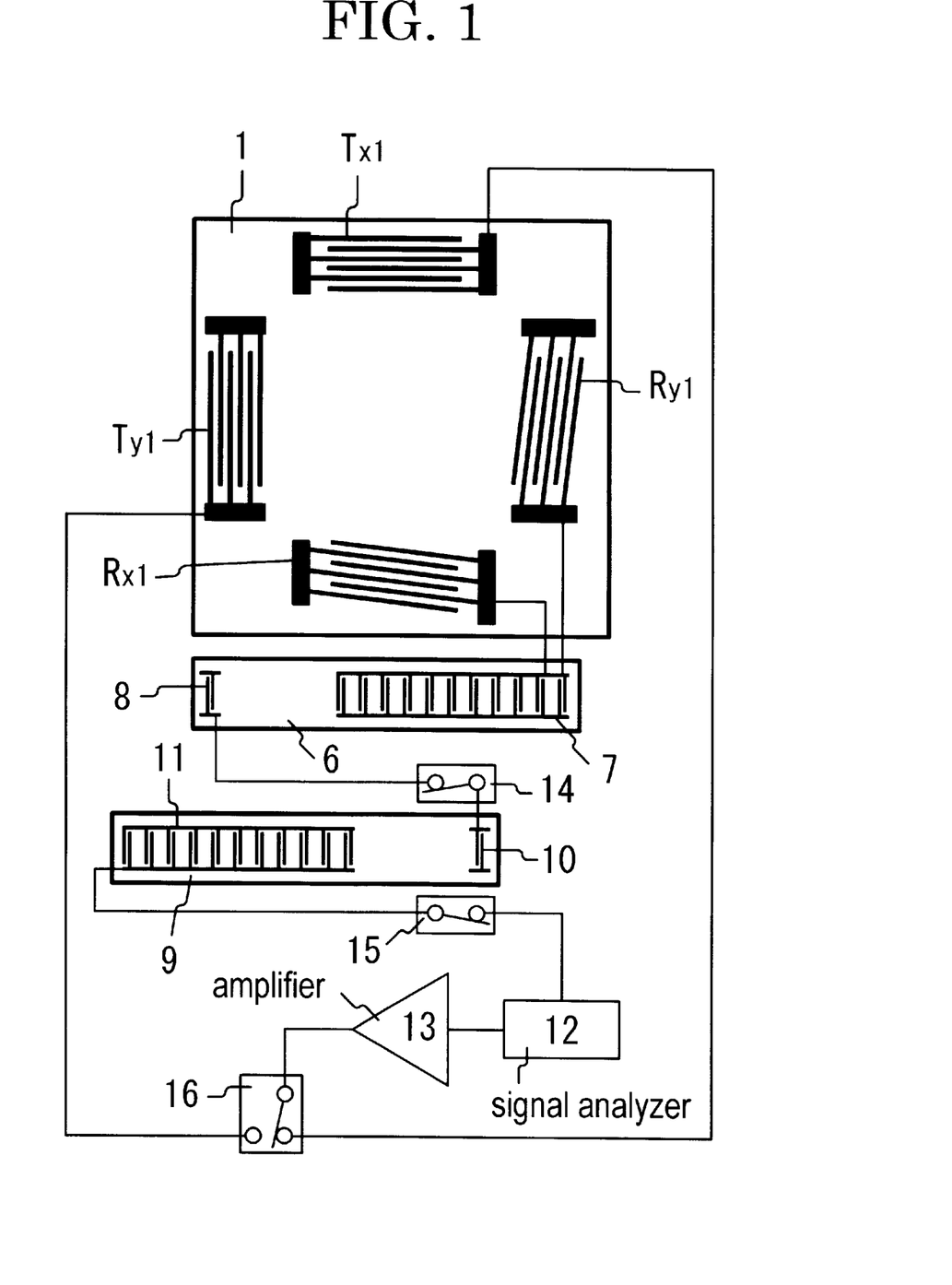
FIG. 1 shows a schematic illustration of an ultrasonic security system for personal computer according to a first embodiment of the present invention.

FIG. 1 shows a schematic illustration of an ultrasonic security system for personal computer according to a first embodiment of the present invention. The ultrasonic security system for personal computer comprises a touch-panel section, a lock section, and a key section. The touch-panel section comprises nonpiezoelectric plate 1, first input piezoelectric substrates (2 and 3), first output piezoelectric substrates (4 and 5), signal analyzer 12, amplifier 13, switches (14, 15 and 16), input IDTs ($T_{x1}$ and $T_{y1}$), and output IDTs ($R_{x1}$ and $R_{y1}$). The lock section connected to the touch-panel section comprises second piezoelectric substrate 6, and coding IDT 7 and terminal IDT 8, which are formed on second piezoelectric substrate 6. The key section, which is attached, only when operating the PC, between the lock section and the touch-panel section through switches (14 and 15), respectively, comprises third piezoelectric substrate 9, and initial IDT 10 and decoding IDT 11, which are formed on third piezoelectric substrate 9. Input IDTs ($T_{x1}$ and $T_{y1}$), output IDTs ($R_{x1}$ and $R_{y1}$), coding IDT 7, terminal IDT 8, initial IDT 10, and decoding IDT 11 are made of an aluminum thin film, respectively. First input piezoelectric substrates (2 and 3), and first output piezoelectric substrates (4 and 5) are not drawn in FIG. 1. Input IDTs ($T_{x1}$ and $T_{y1}$) with an interdigital periodicity P (400 μm) and an overlap length L (12 mm), and output IDTs ($R_{x1}$ and $R_{y1}$) are formed on nonpiezoelectric plate 1.

Figure 2:
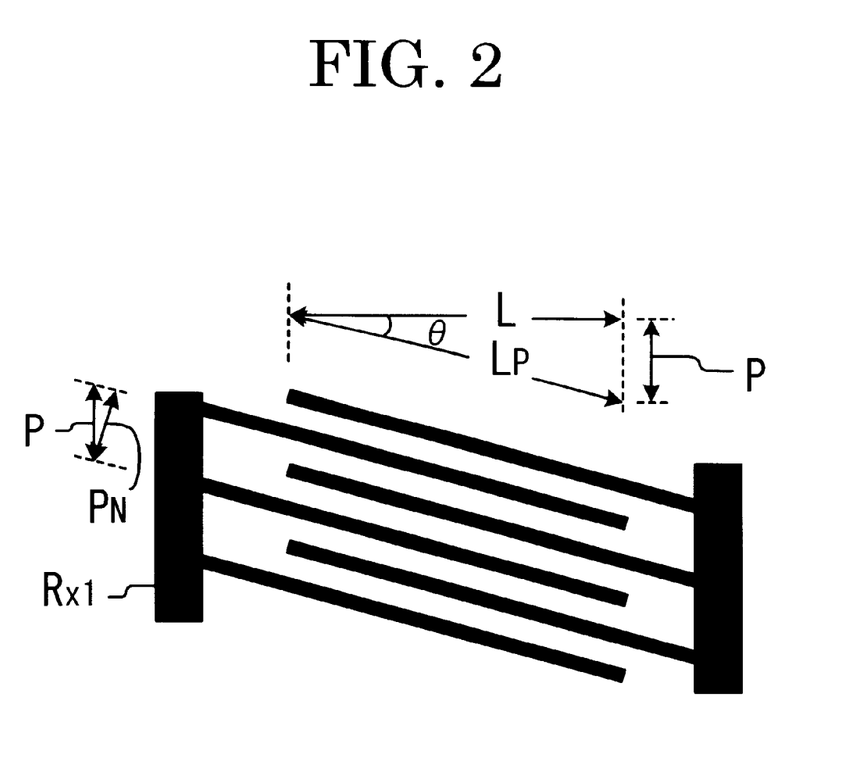
FIG. 2 shows a plan view of output IDT $R_{x1}$.

FIG. 2 shows a plan view of output IDT $R_{x1}$. Output IDT $R_{x1}$ is located such that the electrode-finger direction thereof is slanting to that of input IDT $T_{x1}$ by an angle θ. And then, output IDT $R_{x1}$ has an interdigital periodicity $P_N$ along the orthogonal direction to the electrode-finger direction thereof, and has an overlap length $L_P$ along the electrode-finger direction thereof. The interdigital periodicity $P_N$ is equal to the product of the interdigital periodicity P and cos θ, and the overlap length $L_P$ is equal to not only the product of the overlap length L and sec θ, but also the product of the interdigital periodicity P and cosec θ.

Figure 3:
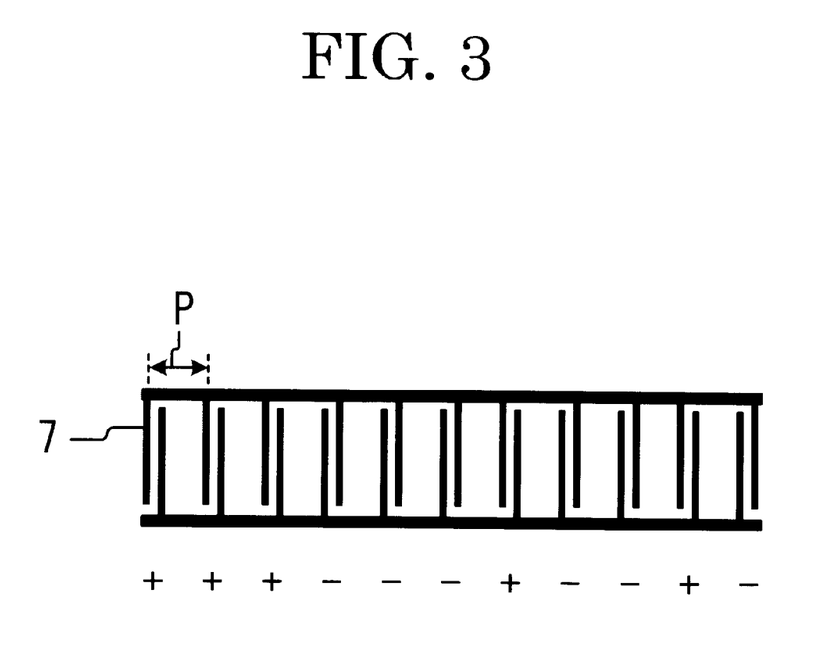
FIG. 3 shows a plan view of coding IDT 7 consisting of eleven interdigital electrode pairs.

FIG. 3 shows a plan view of coding IDT 7 consisting of eleven interdigital electrode pairs. Each pair has an interdigital periodicity of 400 μm, which is the same as the interdigital periodicity P of input IDT $T_{x1}$. Coding IDT 7 has a coded pattern based on the Baker code. Besides an eleven-digits code (1, 1, 1, 0, 0, 0, 1, 0, 0, 1, 0) as shown in FIG. 3, for example, a three-digits code (1, 1, 0), a seven-digits code (1, 1, 1, 0, 0, 1, 0), and others are available. Decoding IDT 11 has the same construction pattern as coding IDT 7.

Figure 4:
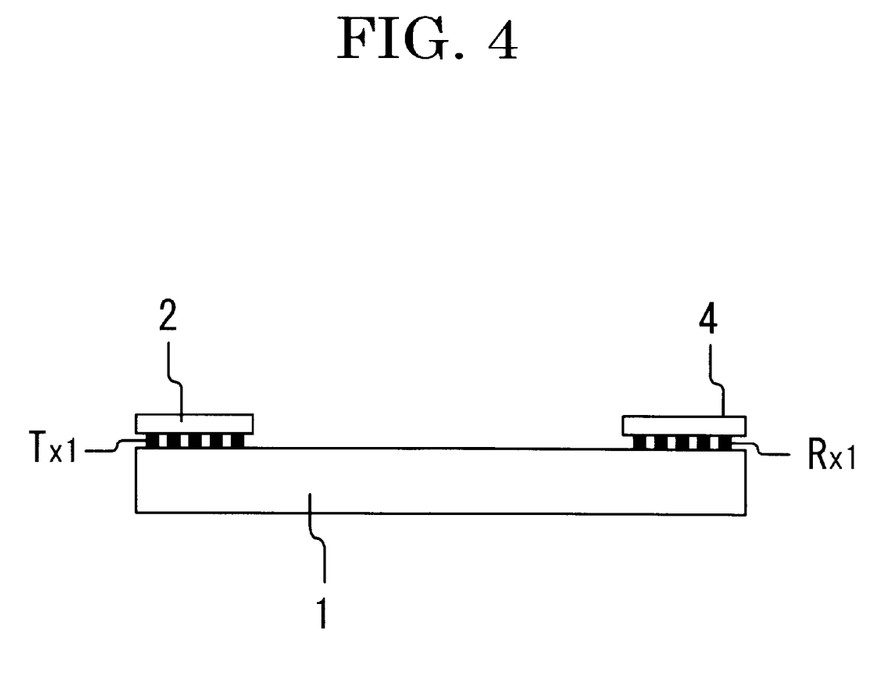
FIG. 4 shows a sectional view of the touch-panel section in FIG. 1.

FIG. 4 shows a sectional view of the touch-panel section in FIG. 1. First input piezoelectric substrate 3, first output piezoelectric substrate 5, signal analyzer 12, amplifier 13, switches (14, 15 and 16), input IDT $T_{y1}$, and output IDT $R_{y1}$ are not drawn in FIG. 4. Nonpiezoelectric plate 1, made of a glass plate, has a dimension of 1.5 mm in thickness. First input piezoelectric substrates (2 and 3), and first output piezoelectric substrates (4 and 5) are made of a piezoelectric ceramic thin plate with a dimension of 150 μm in thickness, respectively, and the polarization axis thereof is parallel to the thickness direction thereof. First input piezoelectric substrates (2 and 3) are mounted on input IDTs ($T_{x1}$ and $T_{y1}$), respectively. First output piezoelectric substrates (4 and 5) are mounted on output IDTs ($R_{x1}$ and $R_{y1}$), respectively.

In the ultrasonic security system for personal computer in FIG. 1, if an input electric signal is applied to input IDT ($T_{x1}$ or $T_{y1}$) via switch 16, a first SAW is excited in first input piezoelectric substrate (2 or 3), respectively. In this time, because first input piezoelectric substrates (2 and 3) are made of a piezoelectric ceramic, respectively, and the polarization axis thereof is parallel to the thickness direction thereof, the first SAW is effectively excited in first input piezoelectric substrate (2 or 3). In addition, if the phase velocity of the first SAW is approximately the same as that of the Rayleigh wave traveling on nonpiezoelectric plate 1 alone, the input electric signal is effectively transduced to the first SAW.

The first SAW excited in first input piezoelectric substrate (2 or 3) is effectively transmitted to first output piezoelectric substrate (4 or 5), respectively, along the upper end surface of nonpiezoelectric plate 1 without a leakage of the first SAW into the inside of nonpiezoelectric plate 1, because (1) the thickness of first input piezoelectric substrates (2 and 3) is smaller than the interdigital periodicity P of input IDTs ($T_{x1}$ and $T_{y1}$), (2) the thickness of nonpiezoelectric plate 1 is larger than three times the interdigital periodicity P, and (3) nonpiezoelectric plate 1 is made of the glass, in which the phase velocity of the first SAW traveling on nonpiezoelectric plate 1 alone is higher than that traveling on first input piezoelectric substrates (2 and 3) alone.

The first SAW transmitted to first output piezoelectric substrate 4 is transduced to electric signals $E_{xj}$ (j=1, 2, ..., n) at output IDT $R_{x1}$. Thus, SAW propagation lanes $W_{xj}$ (j=1, 2, ..., n) on the upper end surface of nonpiezoelectric plate 1 are formed between input IDT $T_{x1}$ and output IDT $R_{x1}$. In the same way, the first SAW transmitted to first output piezoelectric substrate 5 is transduced to electric signals $E_{yj}$ (j=1, 2, ..., n) at output IDT $R_{y1}$. Thus, SAW propagation lanes $W_{yj}$ (j=1, 2, ..., n) are formed between input IDT $T_{y1}$ and output IDT $R_{y1}$.

If touching a position which is not only on one of the SAW propagation lanes $W_{xj}$ but also on one of the SAW propagation lanes $W_{yj}$, one of the electric signals $E_{xj}$ or one of the electric signals $E_{yj}$ is detected at output IDT ($R_{x1}$ or $R_{y1}$), respectively. In other words, if touching nowhere, no electric signal is detected at output IDTs ($R_{x1}$ and $R_{y1}$), because the sum of the phases of the electric signals $E_{xj}$ which linearly correlate to the SAW propagation lanes $W_{xj}$ and that of the electric signals $E_{yj}$ which linearly correlate to the SAW propagation lanes $W_{yj}$ are both zero as the result of phase compensation. The one of the electric signals $E_{xj}$ or the one of the electric signals $E_{yj}$ is applied to coding IDT 7, so that a second SAW based on the coded pattern is excited on second piezoelectric substrate 6. The second SAW is detected as a coded burst-signal at terminal IDT 8.

The coded burst signal arrives at initial IDT 10 via switch 14, so that a third SAW is excited on third piezoelectric substrate 9. In this time, if the third SAW correlates to the coded pattern, a pulse is detected at decoding IDT 11. In other words, no key section or a key section with a decoding IDT having the different construction pattern from coding IDT 7 causes no pulse. Consequently, far from sensing the touch position, it is not possible to operate the PC having such the ultrasonic security system for personal computer.

The pulse detected at decoding IDT 11 arrives at signal analyzer 12 via switch 15. As a result, the one of the SAW propagation lanes $W_{xj}$ or the one of the SAW propagation lanes $W_{yj}$ is sensed by means of the phase of the pulse. In this time, it should be noticed that which of input IDTs ($T_{x1}$ and $T_{y1}$) receives the input electric signal when the pulse appears at signal analyzer 12. In case that input IDT $T_{x1}$ receives the input electric signal, the one of the SAW propagation lanes $W_{xj}$ is defined, and in case that input IDT $T_{y1}$ receives the input electric signal, the one of the SAW propagation lanes $W_{yj}$ is defined. Thus, the touch position on the one of the SAW propagation lanes $W_{xj}$ and on the one of the SAW propagation lanes $W_{yj}$ is recognized. Moreover, supplying input IDT ($T_{x1}$ or $T_{y1}$) with the pulse via amplifier 13 causes a self-oscillation. And then, sensing the touch position by means of the phase of the pulse makes signal analyzing easy, and causes the circuit construction simplified. In addition, using coding techniques based on software together with the coding technique as mentioned above brings a further security.

Figure 5:
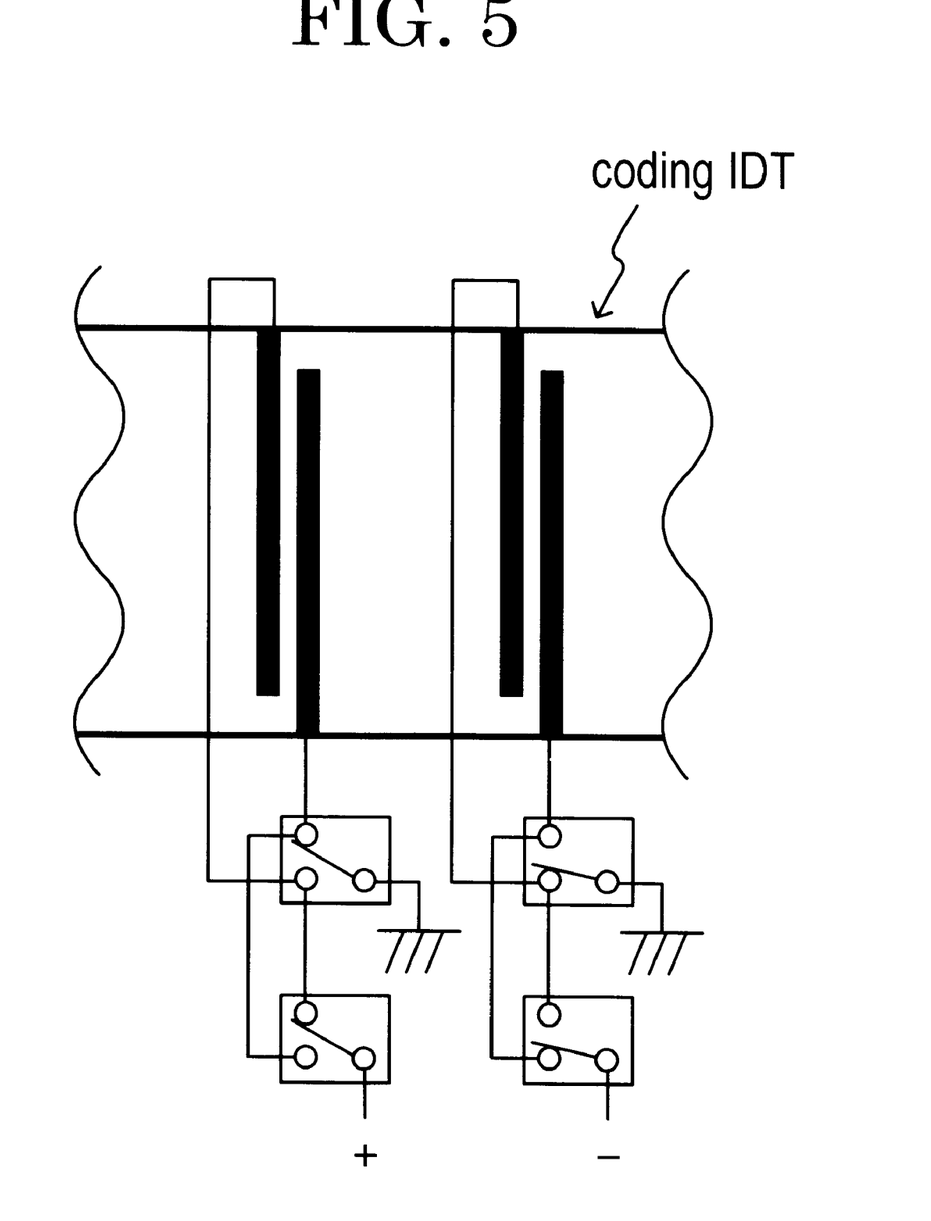
FIG. 5 shows a fragmentary plan view, on an enlarged scale, of a coding IDT used in place of coding IDT 7 and decoding IDT 9.

FIG. 5 shows a fragmentary plan view, on an enlarged scale, of a coding IDT used in place of coding IDT 7 and decoding IDT 11. Changing the polarity of each electrode-finger pair presents a favorite coded pattern. As a result, using the coding IDT in FIG. 5 presents a higher security system for personal computer.

Figure 6:
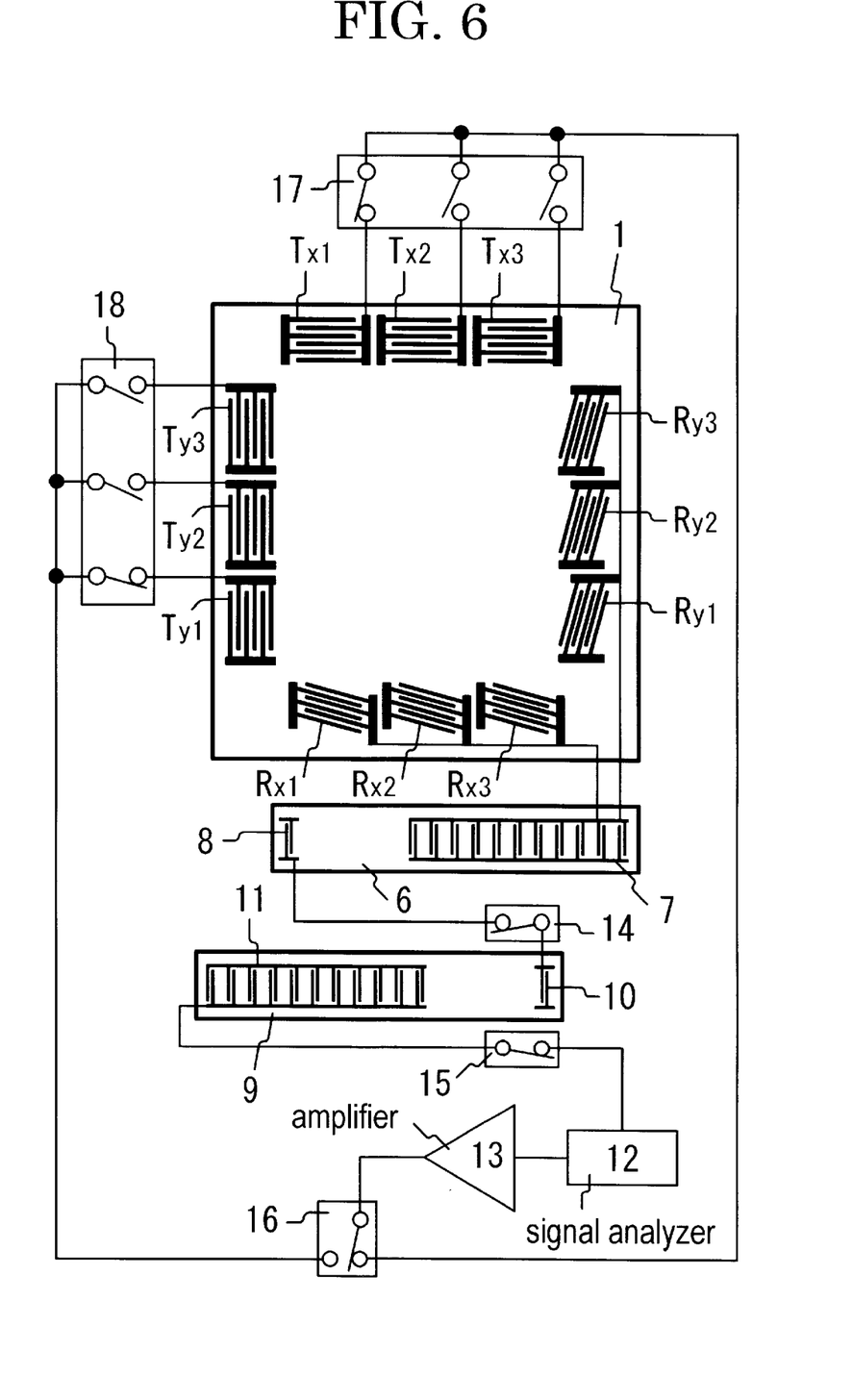
FIG. 6 shows a schematic illustration of an ultrasonic security system for personal computer according to a second embodiment of the present invention.

FIG. 6 shows a schematic illustration of an ultrasonic security system for personal computer according to a second embodiment of the present invention. The ultrasonic security system for personal computer comprises a touch-panel section, a lock section, and a key section. The touch-panel section has the same construction as FIG. 1, except for the presence of switches (17 and 18), input IDTs ($T_{x2}$, $T_{x3}$, $T_{y2}$ and $T_{y3}$) with the same construction patterns as input IDT $T_{x1}$, and output IDTs ($R_{x2}$, $R_{x3}$, $R_{y2}$ and $R_{y3}$) with the same construction patterns as output IDT $R_{x1}$. Nonpiezoelectric plate 1 has a large scale in FIG. 6.

In the ultrasonic security system for personal computer in FIG. 6, if an input electric signal is applied to each of input IDTs ($T_{x1}$, $T_{x2}$ and $T_{x3}$) in turn via switches (16 and 17), a first SAW is excited at each of input IDTs ($T_{x1}$, $T_{x2}$ and $T_{x3}$) in first input piezoelectric substrate 2. The first SAW is effectively transmitted to first output piezoelectric substrate 4, and then, transduced to electric signals $E_{xj}$ at each of output IDTs ($R_{x1}$, $R_{x2}$ and $R_{x3}$). Thus, SAW propagation lanes $W_{xj}$ are formed between input IDT $T_{x1}$ and output IDT $R_{x1}$, or between input IDT $T_{x2}$ and output IDT $R_{x2}$, or between input IDT $T_{x3}$ and output IDT $R_{x3}$. In the same way, if an input electric signal is applied to each of input IDTs ($T_{y1}$, $T_{y2}$ and $T_{y3}$) in turn via switches (16 and 18), a first SAW is excited at each of input IDTs ($T_{y1}$, $T_{y2}$ and $T_{y3}$) in first input piezoelectric substrate 3. The first SAW is effectively transmitted to first output piezoelectric substrate 5, and then, transduced to electric signals $E_{yj}$ at each of output IDTs ($R_{y1}$, $R_{y2}$ and $R_{y3}$). Thus, SAW propagation lanes $W_{yj}$ are formed between input IDT $T_{y1}$ and output IDT $R_{y1}$, or between input IDT $T_{y2}$ and output IDT $R_{y2}$, or between input IDT $T_{y3}$ and output IDT $R_{y3}$.

If touching a position on one of the SAW propagation lanes $W_{xj}$ between, for example, input IDT $T_{x1}$ and output IDT $R_{x1}$, and on one of the SAW propagation lanes $W_{yj}$ between, for example, input IDT $T_{y3}$ and output IDT $R_{y3}$ in FIG. 6, one of the electric signals $E_{xj}$ or one of the electric signals $E_{yj}$ is detected at output IDT ($R_{x1}$ or $R_{y3}$), respectively. In this time, the one of the electric signals $E_{xj}$ is detected at output IDT $R_{x1}$ only when input IDT $T_{x1}$ is connected with amplifier 13 via switches (16 and 17), and the one of the electric signals $E_{yj}$ is detected at output IDT $R_{y3}$ only when input IDT $T_{y3}$ is connected with amplifier 13 via switches (16 and 18). The one of the electric signals $E_{xj}$ or the one of the electric signals $E_{yj}$ is applied to coding IDT 7, so that a second SAW based on the coded pattern is excited on second piezoelectric substrate 6. The second SAW is detected as a coded burst-signal at terminal IDT 8. The coded burst signal arrives at initial IDT 10 via switch 14, so that a third SAW is excited on third piezoelectric substrate 9. In this time, if the third SAW correlates to the coded pattern, a pulse is detected at decoding IDT 11. The pulse arrives at signal analyzer 12 via switch 15. As a result, the one of the SAW propagation lanes $W_{xj}$ or the one of the SAW propagation lanes $W_{yj}$ is sensed by means of the phase of the pulse. In this time, it should be noticed that which of input IDTs ($T_{x1}$, $T_{x2}$, $T_{x3}$, $T_{y1}$, $T_{y2}$ and $T_{y3}$) receives the input electric signal when the pulse appears at signal analyzer 12. For example, if input IDT $T_{x2}$ receives the input electric signal, the one of the SAW propagation lanes $W_{xj}$ between input IDT $T_{x2}$ and output IDT $R_{x2}$ is defined. Thus, the touch position on the one of the SAW propagation lanes $W_{xj}$ and on the one of the SAW propagation lanes $W_{yj}$ is recognized.

Figure 7:
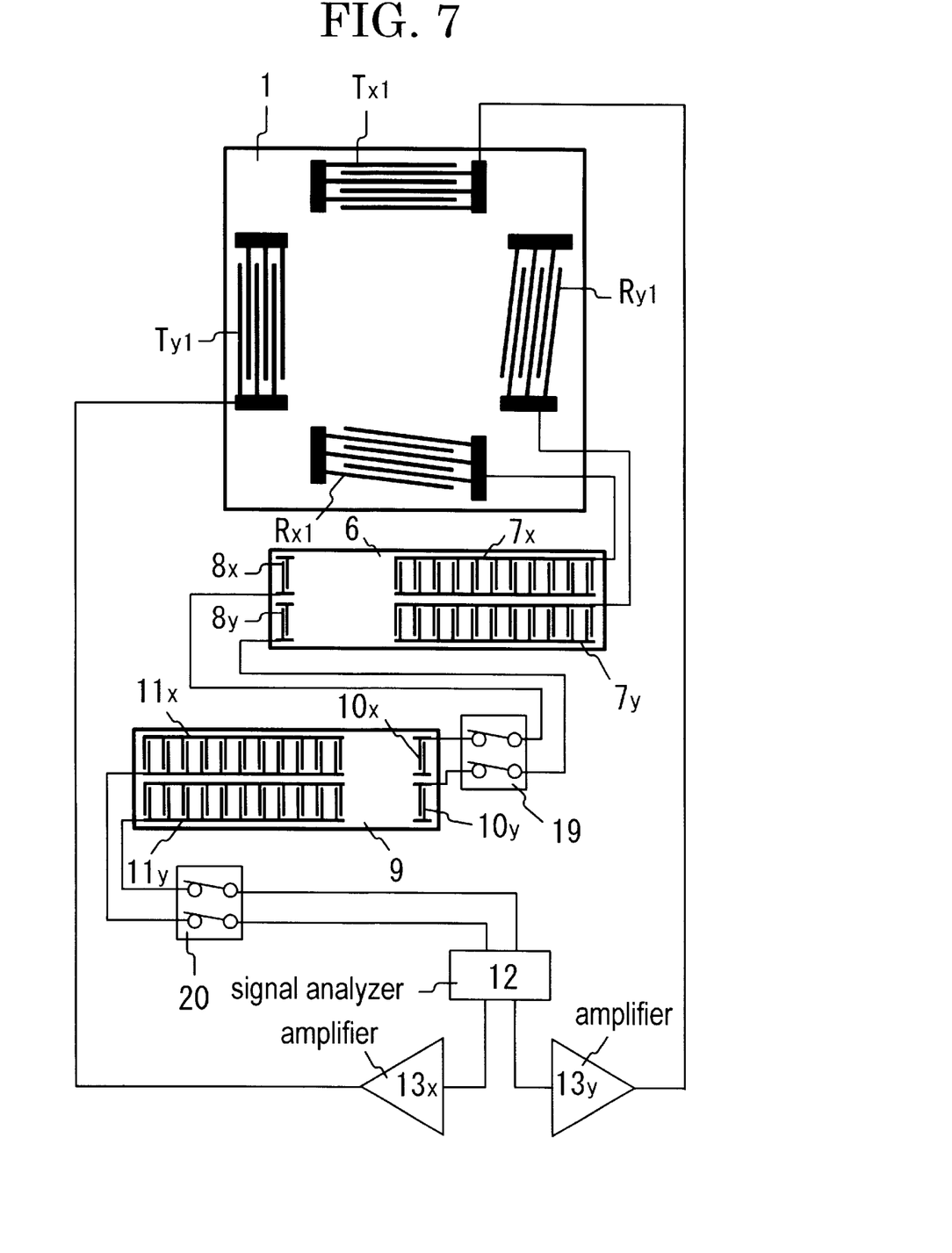
FIG. 7 shows a schematic illustration of an ultrasonic security system for personal computer according to a third embodiment of the present invention.

FIG. 7 shows a schematic illustration of an ultrasonic security system for personal computer according to a third embodiment of the present invention. The ultrasonic security system for personal computer comprises a touch-panel section, a lock section, and a key section. The touch-panel section has the same construction as FIG. 1, except for the absence of amplifier 13 and switches (14, 15 and 16), and the presence of amplifiers ($13_x$ and $13_y$), switches (19 and 20). The lock section has the same construction as FIG. 1, except for the absence of coding IDT 7 and terminal IDT 8, and the presence of coding IDTs ($7_x$ and $7_y$) and terminal IDTs ($8_x$ and $8_y$). The key section has the same construction as FIG. 1, except for the absence of initial IDT 10 and decoding IDT 11, and the presence of initial IDTs ($10_x$ and $10_y$) and decoding IDTs ($11_x$ and $11_y$). Coding IDT $7_x$ and decoding IDT $11_x$ have the same construction patterns each other. In the same way, coding IDT $7_y$ and decoding IDT $11_y$ have the same construction patterns each other.

In the ultrasonic security system for personal computer in FIG. 7, an input electric signal is applied to input IDTs ($T_{x1}$ and $T_{y1}$) simultaneously. In this time, a first SAW is excited in first input piezoelectric substrates (2 and 3), respectively. The first SAWs excited in first input piezoelectric substrates (2 and 3) are effectively transmitted to first output piezoelectric substrates (4 and 5), respectively, and then, transduced to electric signals ($E_{xj}$ and $E_{yj}$) at output IDTs ($R_{x1}$ and $R_{y1}$), respectively. Thus, SAW propagation lanes ($W_{xj}$ and $W_{yj}$) are formed on the upper end surface of nonpiezoelectric plate 1. If touching a position on one of the SAW propagation lanes $W_{xj}$ and one of the SAW propagation lanes $W_{yj}$, one of the electric signals $E_{xj}$ and one of the electric signals $E_{yj}$ are detected at output IDTs ($R_{x1}$ and $R_{y1}$), respectively. The one of the electric signals $E_{xj}$ and the one of the electric signals $E_{yj}$ are applied to coding IDTs ($7_x$ and $7_y$), respectively, so that a second SAW based on the coded pattern is excited at coding IDTs ($7_x$ and $7_y$) on second piezoelectric substrate 6, respectively. The second SAWs are detected as coded burst-signals at terminal IDTs ($8_x$ and $8_y$), respectively. The coded burst signals arrive at initial IDTs ($10_x$ and $10_y$) via switch 19, and then are converted into pulses at decoding IDTs ($11_x$ and $11_y$), respectively. The pulses arrive at signal analyzer 12 via switch 20. As a result, the one of the SAW propagation lanes $W_{xj}$ and the one of the SAW propagation lanes $W_{yj}$ are sensed by means of the phases of the pulses. Thus, the touch position is recognized. Furthermore, using coding IDTs ($7_x$ and $7_y$) with the different coded patterns from each other keeps a still further security.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic security system for personal computer comprising:

a nonpiezoelectric plate;

at least one transducer-unit consisting of at least one input IDT $T_i$ (i=1, 2, . . . , m) with a construction such that distances between two electrode-fingers are equal, and having an interdigital periodicity P and an overlap length L, at least one output IDT $R_i$ (i=1, 2, . . . m) with a construction such that distances between two electrode-fingers are equal, having the electrode-finger direction slanting to that of said at least one input IDT $T_i$ by an angle θ, and having an interdigital periodicity $P_N$ along the orthogonal direction to said electrode-finger direction of said at least one output IDT $R_i$ and an overlap length $L_P$ along said electrode-finger direction of said at least one output IDT $R_i$, a first input piezoelectric substrate, and a first output piezoelectric substrate;

a signal analyzer;

a second piezoelectric substrate;

a coding IDT consisting of interdigital electrode pairs and having a coded pattern;

a terminal IDT having the electrode-finger direction parallel to that of said coding IDT;

a third piezoelectric substrate;

an initial IDT; and a decoding IDT having the same construction pattern as said coding IDT, said nonpiezoelectric plate, said at least one transducer-unit, and said signal analyzer forming a touch-panel section, said second piezoelectric substrate, said coding IDT, and said terminal IDT forming a lock section, said third piezoelectric substrate, said initial IDT, and said decoding IDT forming a key section, said at least one input IDT $T_i$ receiving an input electric signal, exciting a first SAW in said first input piezoelectric substrate by making all the electrode-finger pairs of said at least one input IDT $T_i$ function at the same level, and transmitting said first SAW to said first output piezoelectric substrate along an upper end surface of said nonpiezoelectric plate, said at least one output IDT $R_i$ making all the electrode-finger pairs thereof function at the same level for transducing said first SAW to electric signals $E_j$ (j=32 1, 2, . . . , n), of which the phase delays linearly correlate to SAW propagation lanes $W_j$ (j=1, 2, . . . , n) between said at least one input IDT $T_i$ and said at least one output IDT $R_i$ on said upper end surface of said nonpiezoelectric plate, and detecting one of said electric signals $E_j$ only when touching one of said SAW propagation lanes $W_j$, said coding IDT receiving said one of said electric signals $E_j$, and exciting a second SAW based on said coded pattern on said second piezoelectric substrate, said terminal IDT detecting a coded burst-signal corresponding to said coded pattern, said initial IDT receiving said coded burst-signal, and exciting a third SAW on said third piezoelectric substrate, said decoding IDT detecting a pulse if said third SAW correlates to said coded pattern, and said signal analyzer sensing said one of said SAW propagation lanes $W_j$ by means of the phase of said pulse.

2. An ultrasonic security system for personal computer as defined in claim 1, wherein said interdigital periodicity $P_N$ is equal to the product of said interdigital periodicity P and cos θ, and said overlap length $L_P$ is equal to not only the product of said overlap length L and sec θ, but also the product of said interdigital periodicity P and cosec θ.

3. An ultrasonic security system for personal computer as defined in claim 1, wherein said first input-, first output-, second-, and third piezoelectric substrates are made of a piezoelectric ceramic, respectively, the polarization axis thereof being parallel to the thickness direction thereof.

4. An ultrasonic security system for personal computer as defined in claim 1, wherein said first input-, first output-, second-, and third piezoelectric substrates have a thickness smaller than said interdigital periodicity P, and said nonpiezoelectric plate has a thickness larger than three times said interdigital periodicity P.

5. An ultrasonic security system for personal computer as defined in claim 1, wherein the phase velocity of said first SAW on said nonpiezoelectric plate alone is higher than that in said first input-, and first output piezoelectric substrates alone.

6. An ultrasonic security system for personal computer as defined in claim 1, wherein said touch-panel section further comprises an amplifier connected between said signal analyzer and said at least one input IDT $T_i$.

7. An ultrasonic security system for personal computer comprising:

a nonpiezoelectric plate;

two transducer-units, of which each consists of
at least one input IDT $T_i$ (i=1, 2, . . . , m) with a construction such that distances between two electrode-fingers are equal, and having an interdigital periodicity P and an overlap length L,
at least one output IDT $R_i$ (i=1, 2, . . . , m) with a construction such that distances between two electrode-fingers are equal, having the electrode-finger direction slanting to that of said at least one input IDT $T_i$ by an angle θ, and having an interdigital periodicity $P_N$ along the orthogonal direction to said electrode-finger direction of said at least one output IDT $R_i$ and an overlap length $L_P$ along said electrode-finger direction of said at least one output IDT $R_i$,
a first input piezoelectric substrate, and
a first output piezoelectric substrate;

a signal analyzer;

a second piezoelectric substrate;

two coding IDTs, of which each consists of interdigital electrode pairs and having a coded pattern;

two terminal IDTs having the electrode-finger directions parallel to those of said two coding IDTs, respectively;

a third piezoelectric substrate two initial IDTs; and two decoding IDTs having the same construction patterns as said two coding IDTs, respectively,
said nonpiezoelectric plate, said two transducer-units, and said signal analyzer forming a touch-panel section,
said second piezoelectric substrate, said two coding IDTs, and said two terminal IDTs forming a lock section,
said third piezoelectric substrate, said two initial IDTs, and said two decoding IDTs forming a key section,
said at least one input IDT $T_i$ of each of said two transducer-units receiving an input electric signal, exciting a first SAW in said first input piezoelectric substrate by making all the electrode-finger pairs of said at least one input IDT $T_i$ of each of said two transducer-units function at the same level, and transmitting said first SAW to said first output piezoelectric substrate along an upper end surface of said nonpiezoelectric plate,
said at least one output IDT $R_i$ of each of said two transducer-units making all the electrode-finger pairs thereof function at the same level for transducing said first SAW to electric signals $E_j$ (j=1, 2, . . . , n), of which the phase delays linearly correlate to SAW propagation lanes $W_j$ (j=1, 2, . . . , n) between said at least one input IDT $T_i$ and said at least one output IDT $R_i$ on said upper end surface of said nonpiezoelectric plate, and detecting one of said electric signals $E_j$ only when touching one of said SAW propagation lanes $W_j$,
each of said two coding IDTs receiving said one of said electric signals $E_j$, and exciting a second SAW based on said coded pattern on said second piezoelectric substrate,
each of said two terminal IDTs detecting a coded burst-signal corresponding to said coded pattern,
each of said two initial IDTs receiving said coded burst-signal, and exciting a third SAW on said third piezoelectric substrate,
each of said two decoding IDTs detecting a pulse if said third SAW correlates to said coded pattern, and
said signal analyzer sensing said one of said SAW propagation lanes $W_j$ by means of the phase of said pulse.

8. An ultrasonic security system for personal computer as defined in claim 7, wherein said two coding IDTs have the different coded patterns from each other.

9. An ultrasonic security system for personal computer as defined in claim 7, wherein said interdigital periodicity $P_N$ is equal to the product of said interdigital periodicity P and cos θ, and said overlap length $L_P$ is equal to not only the product of said overlap length L and sec θ, but also the product of said interdigital periodicity P and cosec θ.

10. An ultrasonic security system for personal computer as defined in claim 7, wherein said first input-, first output-, second-, and third piezoelectric substrates are made of a piezoelectric ceramic, respectively, the polarization axis thereof being parallel to the thickness direction thereof.

11. An ultrasonic security system for personal computer as defined in claim 7, wherein said first input-, first output-, second-, and third piezoelectric substrates have a thickness smaller than said interdigital periodicity P, and said nonpiezoelectric plate has a thickness larger than three times said interdigital periodicity P.

12. An ultrasonic security system for personal computer as defined in claim 7, wherein the phase velocity of said first SAW on said nonpiezoelectric plate alone is higher than that in said first input-, and first output piezoelectric substrates alone.

13. An ultrasonic security system for personal computer as defined in claim 7, wherein said touch-panel section further comprises two amplifiers, of which each is connected between said signal analyzer and said at least one input IDT $T_i$ of each of said two transducer-units.

* * * * *